United States Patent
Liu et al.

(10) Patent No.: US 12,464,616 B2
(45) Date of Patent: Nov. 4, 2025

(54) PWM SIGNAL CONVERSION CIRCUIT AND METHOD, AND LED DIMMING SYSTEM

(71) Applicant: CRM ICBG (WUXI) CO., LTD., Wuxi (CN)

(72) Inventors: Jun Liu, Wuxi (CN); Quanqing Wu, Wuxi (CN); Guocheng Li, Wuxi (CN)

(73) Assignee: CRM ICBG ( wuxi ) Co., ltd., Jiangsu (CN)

( * ) Notice: Subject to any disclaimer, the term of this patent is extended or adjusted under 35 U.S.C. 154(b) by 92 days.

(21) Appl. No.: 18/294,551

(22) PCT Filed: Jul. 29, 2022

(86) PCT No.: PCT/CN2022/108902
§ 371 (c)(1),
(2) Date: Feb. 2, 2024

(87) PCT Pub. No.: WO2023/016279
PCT Pub. Date: Feb. 16, 2023

(65) Prior Publication Data
US 2025/0106963 A1    Mar. 27, 2025

(30) Foreign Application Priority Data
Aug. 9, 2021 (CN) .......................... 202110909686.6

(51) Int. Cl.
*H05B 45/30* (2020.01)
*H05B 45/10* (2020.01)
*H05B 45/325* (2020.01)

(52) U.S. Cl.
CPC ........... *H05B 45/325* (2020.01); *H05B 45/10* (2020.01)

(58) Field of Classification Search
CPC ...... H05B 45/10; H05B 45/30; H05B 45/325; H05B 45/37; H05B 47/10
See application file for complete search history.

(56) References Cited

FOREIGN PATENT DOCUMENTS

| | | | |
|---|---|---|---|
| CN | 109982489 A | | 7/2019 |
| CN | 110022630 A | | 7/2019 |
| CN | 111901938 A | | 11/2020 |
| CN | 213818279 U | * | 7/2021 |
| JP | 2018055785 A | | 4/2018 |
| JP | 2018156857 A | | 10/2018 |

* cited by examiner

*Primary Examiner* — Jimmy T Vu
(74) *Attorney, Agent, or Firm* — IPRTOP LLC (57) ABSTRACT

A PWM signal conversion circuit and method, and an LED dimming system. The circuit includes: a PWM signal detection module, which outputs a first voltage corresponding to a low-level time of the PWM signal and a second voltage corresponding to a high-level time of the PWM signal; an addition module, which sums the first and second voltages to obtain a third voltage; a switch signal generation module, which generates a switch signal based on the third voltage; a duty cycle ratio generation module, which obtains a duty cycle ratio of the PWM signal based on a counting to the high level of the PWM signal by the switch signal; and an output voltage generation module, which obtains an output voltage related to a duty cycle of the PWM signal based on the duty cycle ratio.

15 Claims, 4 Drawing Sheets

PWM SIGNAL CONVERSION CIRCUIT AND METHOD, AND LED DIMMING SYSTEM

TECHNICAL FIELD

The present disclosure relates to the field of integrated circuit design, in particular, to a PWM signal conversion circuit and method, and an LED dimming system.

BACKGROUND

Figure 1:
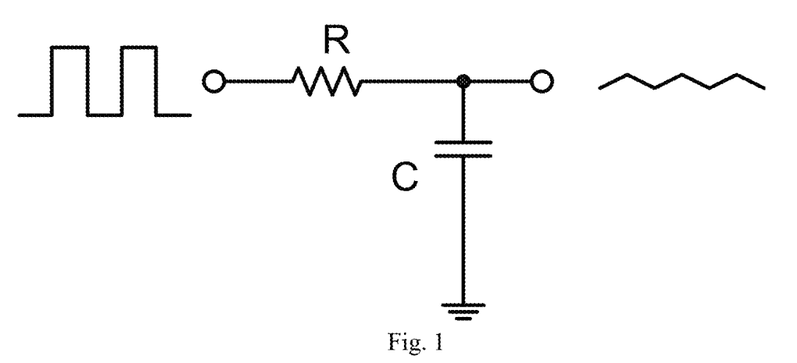
FIG. 1 shows a schematic diagram of the structure of an RC low-pass filter circuit in the prior art.

In the application of LED lighting, a low-pass filter is commonly used to convert the dimming Pulse Width Modulation (PWM) signal into an analog signal. FIG. 1 shows a common RC filter circuit in a low-pass filter. To filter the PWM signal into an analog signal by using a low-pass filter, a large-capacity capacitor C is required to filter the low-frequency PWM signal into a low-ripple analog signal for internal use by the chip, which cannot be integrated internally. For a given PWM signal, $$\text{Duty} = \frac{T_{ON}}{T_{ON} + T_{OFF}},$$

the desired analog signal is Duty*Vref.

In addition, it is possible to obtain the values of $T_{on}$ and $T_{off}$ through digital sampling techniques to perform digital calculations and obtain the corresponding analog signal. However, due to the need for division in the equation $$\text{Duty} = \frac{T_{ON}}{T_{ON} + T_{OFF}},$$

it is difficult to implement in a simple manner in digital circuits.

Therefore, how to propose an easily implementable PWM signal conversion voltage while reducing the complexity of the peripheral circuit and reducing costs has become one of the urgent problems to be solved by those skilled in the art.

SUMMARY

In view of the above-mentioned drawbacks of the prior art, the purpose of the present disclosure is to provide a PWM signal conversion circuit and method, and an LED dimming system to solve the problems of complex peripheral circuit, high costs, and difficult implementation in the art.

To achieve the above objectives and other related objectives, the present disclosure provides a PWM signal conversion circuit. The PWM signal conversion circuit includes at least:

a PWM signal detection module, receiving a PWM signal, detecting a low-level time and a high-level time of the PWM signal, and outputting a first voltage corresponding to the low-level time and a second voltage corresponding to the high-level time;

an addition module connected to an output end of the PWM signal detection module, summing the first voltage and the second voltage to obtain a third voltage;

a switch signal generation module connected to an output end of the addition module, generating a switch signal based on the third voltage, wherein a frequency of the switch signal is higher than a frequency of the PWM signal;

a duty cycle ratio generation module connected to an output end of the switch signal generation module, starting counting the switch signal at a rising edge of the PWM signal, ending the counting at a falling edge of the PWM signal, and obtaining a duty cycle ratio of the PWM signal; and an output voltage generation module connected to an output end of the duty cycle ratio generation module, obtaining an output voltage related to a duty cycle of the PWM signal based on the duty cycle ratio of the PWM signal.

Optionally, the PWM signal detection module includes a detection unit, a first counting unit, a first digital-to-analog conversion unit, and a time-voltage conversion unit.

The detection unit receives the PWM signal and detects a falling edge, a rising edge, a low level, and a high level of the PWM signal.

The first counting unit is connected to an output end of the detection unit, counts a total number of falling and rising edges of the PWM signal based on a sampling clock signal, and outputs a counting result and overflow bit.

The first digital-to-analog conversion unit is connected to an output end of the first counting unit and converts the counting result into an analog signal.

The time-voltage conversion unit is connected to output ends of the detection unit, the first counting unit, and the first digital-to-analog conversion unit, and generates the first voltage and the second voltage based on an output signal from the first digital-to-analog conversion unit, the overflow bit, and a detection signal of the PWM signal.

More optionally, the first counting unit comprises an adder and a counter; the adder is connected to an output end of the detection unit, and sums a rising edge trigger signal and a falling edge trigger signal of the PWM signal; a reset end of the counter is connected to an output end of the adder, a clock end of the counter receives the sampling clock signal, a first output end of the counter outputs the counting result, and a second output end of the counter outputs the overflow bit.

More optionally, the time-voltage conversion unit comprises a first switch, a second switch, a third switch, a fourth switch, a fifth switch, a sixth switch, a first diode, a second diode, a first capacitor, a second capacitor, a first voltage output subunit, a second voltage output subunit, a first controller, and a second controller.

An end of the first switch is connected to the output end of the first digital-to-analog conversion unit, another end of the first switch is connected to an input end of the first voltage output subunit, and a control end of the first switch is connected to a rising edge trigger signal of the PWM signal.

An end of the second switch is connected to the output end of the first digital-to-analog conversion unit, another end of the second switch is connected to an anode of the first diode, and a control end of the second switch is connected to a low-level detection signal of the PWM signal; a cathode of the first diode is connected to the input end of the first voltage output subunit.

An end of the third switch is connected to the output end of the first digital-to-analog conversion unit, another end of the third switch is connected to an input end of the second voltage output subunit, and a control end of the third switch is connected to a falling edge trigger signal of the PWM signal.

An end of the fourth switch is connected to the output end of the first digital-to-analog conversion unit, another end of the fourth switch is connected to an anode of the second diode, and a control end of the fourth switch is connected to a high-level detection signal of the PWM signal; a cathode of the second diode is connected to the input end of the second voltage output subunit.

An upper electrode plate of the second capacitor is connected to the input end of the first voltage output subunit, and a lower electrode plate of the second capacitor is grounded.

An upper electrode of the first capacitor is connected to the input end of the second voltage output subunit, and a lower electrode of the first capacitor is grounded.

The first controller is connected to the output ends of the detection unit and the first counting unit; the first controller generates a control signal for the fifth switch based on the low-level detection signal of the PWM signal and the overflow bit; the fifth switch is connected in parallel with two ends of the first capacitor, and the fifth switch conducts when the PWM signal is at a low level and the overflow bit is valid.

The second controller is connected to the output ends of the detection unit and the first counting unit; the second controller generates a control signal for the sixth switch based on the high-level detection signal of the PWM signal and the overflow bit; the sixth switch is connected in parallel with two ends of the second capacitor, and the sixth switch conducts when the PWM signal is at a high level and the overflow bit is valid.

More optionally, the first controller and the second controller are AND logic gates, and the fifth switch and the sixth switch are NMOS transistors.

More optionally, the third voltage satisfies the following equation:

$$V_{o1} = V_{Toff} + V_{Ton} = \frac{T_{PWM}}{T_{H\_CLK}} \cdot \frac{Vref}{2^{DAC}}.$$

In the equation, $V_{o1}$ is the third voltage; $V_{Toff}$ is the first voltage; $V_{Ton}$ is the second voltage; $T_{PWM}$ is a period of the PWM signal; $T_{H\_CLK}$ is a period of the sampling clock signal;

$$\frac{Vref}{2^{DAC}}$$

is an output voltage accuracy of the first digital-to-analog conversion unit; $V_{ref}$ is the highest output reference voltage of the first digital-to-analog conversion unit, and DAC is a number of bits of the first digital-to-analog conversion unit.

Optionally, the switch signal generation module comprises a current source, a third capacitor, a comparison unit, and a seventh switch.

An end of the current source is connected to a power supply voltage, and the other end of the current source is connected to an upper electrode plate of the third capacitor; a lower electrode plate of the third capacitor is grounded.

Input ends of the comparison unit are respectively connected to the upper electrode plate of the third capacitor and the output end of the addition module, and an output end of the comparison unit is connected to a control end of the seventh switch.

The seventh switch is connected in parallel with two ends of the third capacitor, and the seventh switch conducts when a voltage at the upper electrode plate of the third capacitor reaches the third voltage.

More optionally, a frequency of the switch signal satisfies the following equation:

$$F_{new} = \frac{I1}{C3 \cdot V_{o1}} = K1 \cdot F_{PWM}.$$

In the equation, $F_{new}$ is the frequency of the switch signal; K1 is a multiple of the frequency of the switch signal higher than the frequency of the PWM signal, set to a fixed value; $F_{PWM}$ is the frequency of the PWM signal; I1 is a current flowing through the current source; C3 is a capacitance value of the third capacitor; $V_{o1}$ is a voltage value of the third voltage.

Optionally, the duty cycle ratio generation module comprises a second counting unit and a latch.

A clock end of the second counting unit is connected to the output end of the switch signal generation module, and a reset end of the second counting unit is connected to a rising edge trigger signal of the PWM signal.

An input end of the latch is connected to an output end of the second counting unit, a control end of the latch is connected to a falling edge trigger signal of the PWM signal, and the latch outputs the duty cycle ratio of the PWM signal.

Optionally, the output voltage generation module comprises a second digital-to-analog conversion unit and a voltage division unit; the second digital-to-analog conversion unit receives the duty cycle ratio of the PWM signal and converts it into an analog signal; the voltage division unit is connected to an output end of the second digital-to-analog conversion unit to perform voltage division on the analog signal output by the second digital-to-analog conversion unit to obtain the output voltage.

To achieve the above objectives and other related objectives, the present disclosure further provides a PWM signal conversion method. The method includes at least:
  obtaining a PWM signal, detecting a low-level time of the PWM signal and obtaining a corresponding first voltage, and detecting a high-level time of the PWM signal and obtaining a corresponding second voltage;
  summing the first voltage with the second voltage to obtain a third voltage;
  generating a switch signal based on the third voltage, wherein a frequency of the switch signal is higher than a frequency of the PWM signal by a fixed multiple;
  counting a high level of the PWM signal based on the switch signal and generating a duty cycle ratio of the PWM signal; and
  obtaining an output voltage related to a duty cycle of the PWM signal based on the duty cycle ratio of the PWM signal.

Optionally, the method further includes: counting a sum of rising and falling edges of the PWM signal, and converting a counting result into an analog signal; and generating the first voltage and the second voltage based on the analog signal of the counting result and a rising edge trigger signal, a falling edge trigger signal, a high-level detection signal, and a low-level detection signal of the PWM signal.

Optionally, the fixed multiple is set to 100 times.

To achieve the above objectives and other related objectives, the present disclosure further provides an LED dimming system. The system includes at least:
  the above PWM signal conversion circuit, which converts a dimming PWM signal into an analog output voltage; and an LED driving circuit connected to the PWM signal conversion circuit, which drives an LED light string for dimming control based on an output signal of the PWM signal conversion circuit.

As mentioned above, the PWM signal conversion circuit and method, and the LED dimming system of the present disclosure have the following beneficial effects:

1. The PWM signal conversion circuit and method, and the LED dimming system of the present disclosure can extract the duty cycle ratio of low-frequency PWM signals without the need for large capacitors. The circuit and system can be integrated inside the chip, simplifying the peripheral circuit of the chip.

2. The extraction of the duty cycle ratio of the PWM signal in the PWM signal conversion circuit and method and the LED dimming system of the present disclosure can be achieved by just one PWM signal cycle, enabling the output signal to changes with the PWM signal in real-time. This is in contrast to the commonly used filtering methods which require several PWM signal cycles to achieve stability.

3. The PWM signal conversion circuit and method, and the LED dimming system of the present disclosure count the duty cycle of the PWM signal at a frequency that is a fixed multiple of the PWM frequency itself. Therefore, regardless of how the PWM signal frequency changes, the counting of the duty cycle remains constant and highly accurate.

4. The PWM signal conversion circuit and method, and the LED dimming system of the present disclosure set the fixed multiple as K1=100. The count value output by the duty cycle ratio generation module can be directly used as the reading of the duty cycle of the PWM signal.

COMPONENT REFERENCE NUMERALS

1 PWM signal conversion circuit
11 PWM signal detection module
111 Detection unit
111*a* Falling edge trigger
111*b* Rising edge trigger
111*c* Low-level detector
111*d* High-level detector
112 First counting unit
112*a* Adder
112*b* Counter
113 First digital-to-analog conversion unit
114 Time-voltage conversion unit
114*a* First voltage output subunit
114*b* Second voltage output subunit
114*c* First controller
114*d* Second controller
12 Addition module
13 Switch signal generation module
131 Comparison unit
14 Duty cycle ratio generation module
141 Second counting unit
142 Latch
15 Output voltage generation module
151 Second digital-to-analog conversion unit
152 Voltage division unit
2 LED driving circuit
S1-S5 Steps

DETAILED DESCRIPTION

The embodiments of the present disclosure will be described below through exemplary embodiments. Those skilled in the art can easily understand other advantages and effects of the present disclosure according to contents disclosed by the specification. The present disclosure can also be implemented or applied through other different exemplary embodiments. Various modifications or changes can also be made to all details in the specification based on different points of view and applications without departing from the spirit of the present disclosure.

Please refer to FIGS. 2 to 5. It needs to be stated that the drawings provided in the following embodiments are just used for schematically describing the basic concept of the present disclosure, thus illustrating components related to the present disclosure and are not drawn according to the numbers, shapes and sizes of components during actual implementation, the configuration, number and scale of each component during actual implementation thereof may be freely changed, and the component layout configuration thereof may be more complex.

Embodiment 1

Figure 2:
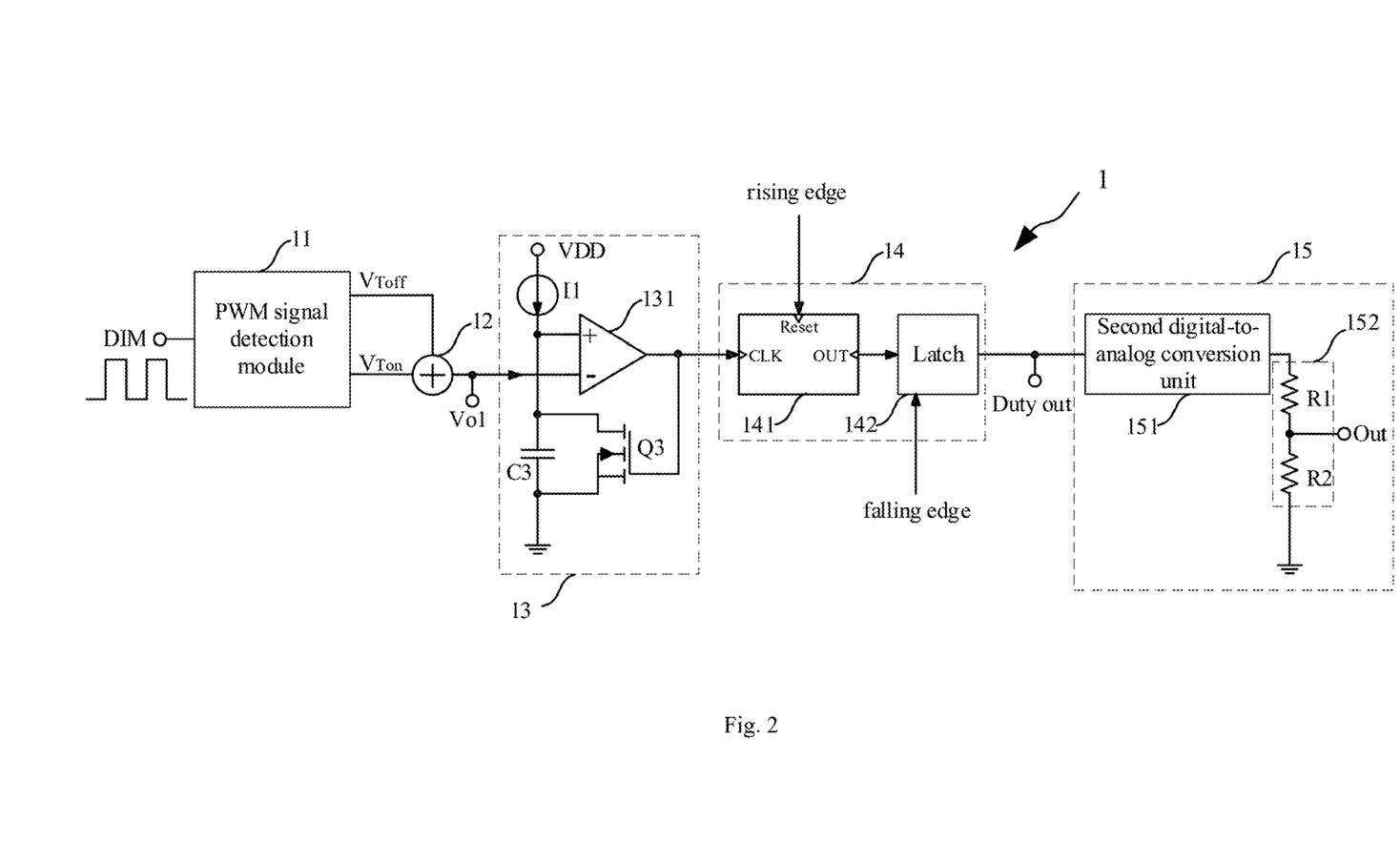
FIG. 2 shows a schematic diagram of the structure of a PWM signal conversion circuit of the present disclosure.

As shown in FIG. 2, this embodiment provides a PWM signal conversion circuit. The PWM signal conversion circuit includes:

A PWM signal detection module 11, an addition module 12, a switch signal generation module 13, a duty cycle ratio generation module 14, and an output voltage generation module 15.

As shown in FIG. 2, the PWM signal detection module 11 receives a PWM signal, detects a low-level time and a high-level time of the PWM signal, and outputs a first voltage $V_{Toff}$ corresponding to the low-level time and a second voltage $V_{Ton}$ corresponding to the high-level time.

Specifically, in this embodiment, the PWM signal is input to the PWM signal detection module 11 through a dimming port DIM to achieve dimming control. In practical use, the present disclosure is applicable to any situation where a PWM signal needs to be converted into an analog signal.

Figure 3:
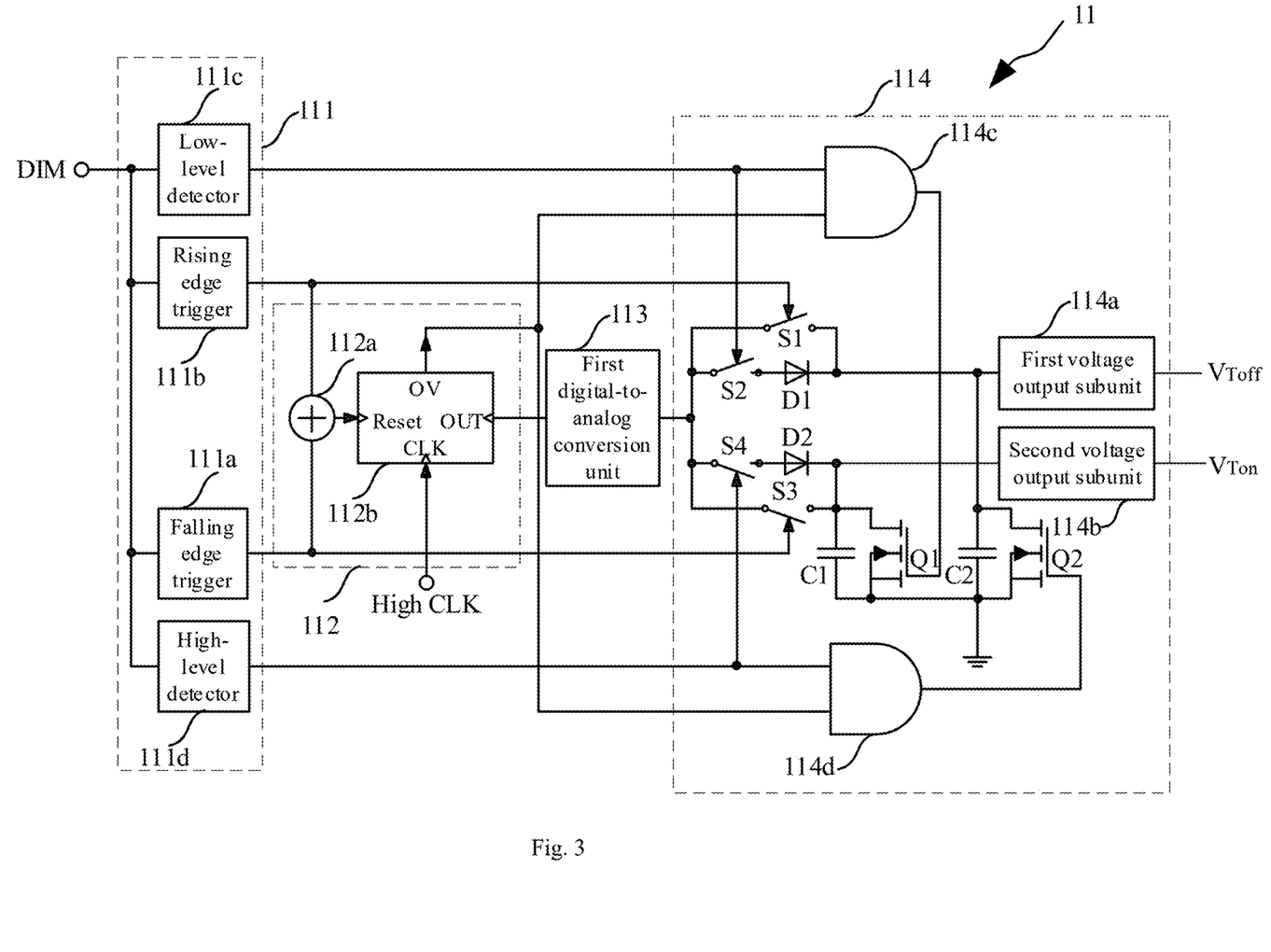
FIG. 3 shows a schematic diagram of the structure of a PWM signal detection module of the present disclosure.

Specifically, as shown in FIG. 3, in this embodiment, the PWM signal detection module 11 includes a detection unit 111, a first counting unit 112, a first digital-to-analog conversion unit 113, and a time-voltage conversion unit 114. In actual use, any circuit structure that can obtain the first voltage $V_{Toff}$ corresponding to the low-level time of the PWM signal and the second voltage $V_{Ton}$ corresponding to the high-level time of the PWM signal is applicable to the present disclosure and is not limited to this embodiment.

More specifically, the detection unit 111 receives the PWM signal and detects the falling edge, rising edge, low level, and high level of the PWM signal. As an example, the detection unit 111 includes a falling edge trigger 111*a*, a rising edge trigger 111*b*, a low-level detector 111*c*, and a high-level detector 111*d*. The falling edge trigger 111*a*, the rising edge trigger 111*b*, the low-level detector 111*c*, and the high-level detector 111*d* respectively receive the PWM signal and perform the corresponding detection.

More specifically, the first counting unit 112 is connected to an output end of the detection unit 111. It counts the total number of rising and falling edges of the PWM signal based on a sampling clock signal "High CLK", and outputs a counting result and an overflow bit. The frequency of the sampling clock signal "High CLK" is higher than the frequency of the PWM signal. As an example, the first counting unit 112 includes an adder 112*a* and a counter 112*b*. The adder 112*a* is connected to the output end of the detection unit 111, and sums a rising edge trigger signal and a falling edge trigger signal of the PWM signal. A reset end "Reset" of the counter 112*b* is connected to an output end of the adder 112*a*, and a clock end "CLK" of the counter 112*b* receives the sampling clock signal "High CLK". A first output end "OUT" of the counter 112*b* outputs the counting result, and a second output end "OV" of the counter 112*b* outputs the overflow bit. It should be noted that both the rising and falling edges of the PWM signal trigger the counting. In the case where both the rising and falling edges can trigger the counter for counting, there is no need to set an adder, which is not limited to this embodiment.

More specifically, the first digital-to-analog conversion unit 113 is connected to an output end of the first counting unit 112 to convert the counting result into an analog signal. Any circuit structure capable of achieving digital-to-analog conversion is applicable to the present disclosure.

More specifically, the time-voltage conversion unit 114 is connected to output ends of the detection unit 111, the first counting unit 112, and the first digital-to-analog conversion unit 113. The time-voltage conversion unit 114 generates the first voltage $V_{Toff}$ and the second voltage $V_{Ton}$ based on an analog signal output from the first digital-to-analog conversion unit 113, the overflow bit, and a detection signal of the PWM signal. As an example, the time-voltage conversion unit 114 includes a first switch S1, a second switch S2, a third switch S3, a fourth switch S4, a fifth switch Q1, a sixth switch Q2, a first diode D1, a second diode D2, a first capacitor C1, a second capacitor C2, a first voltage output subunit 114*a*, a second voltage output subunit 114*b*, a first controller 114*c*, and a second controller 114*d*. An end of the first switch S1 is connected to the output end of the first digital-to-analog conversion unit 113, another end of the first switch S1 is connected to an input end of the first voltage output subunit 114*a*, and a control end of the first switch S1 is connected to a rising edge trigger signal of the PWM signal. An end of the second switch S2 is connected to the output end of the first digital-to-analog conversion unit 113, another end of the second switch S2 is connected to an anode of the first diode D1, and a control end of the second switch S2 is connected to a low-level detection signal of the PWM signal. A cathode of the first diode D1 is connected to the input end of the first voltage output subunit 114*a*. An end of the third switch S3 is connected to the output end of the first digital-to-analog conversion unit 113, another end of the third switch S3 is connected to an input end of the second voltage output subunit 114*b*, and a control end of the third switch S3 is connected to a falling edge trigger signal of the PWM signal. An end of the fourth switch S4 is connected to the output end of the first digital-to-analog conversion unit 113, another end of the fourth switch S4 is connected to an anode of the second diode D2, and a control end of the fourth switch S4 is connected to a high-level detection signal of the PWM signal. A cathode of the second diode D2 is connected to the input end of the second voltage output subunit 114*b*. An upper electrode plate of the second capacitor C2 is connected to the input end of the first voltage output subunit 114*a*, and a lower electrode plate of the second capacitor C2 is grounded. An upper electrode plate of the first capacitor C1 is connected to the input end of the second voltage output subunit 114*b*, and a lower electrode plate of the first capacitor C1 is grounded. The first controller 114*c* is connected to output ends of the detection unit 111 and the first counting unit 112. The first controller 114*c* generates a control signal for the fifth switch Q1 based on the low-level detection signal of the PWM signal and the overflow bit. The fifth switch Q1 is connected in parallel with two ends of the first capacitor C1. The fifth switch Q1 conducts when the PWM signal is at a low level and the overflow bit is valid. The second controller 114*d* is connected to the output ends of the detection unit 111 and the first counting unit 112. The second controller 114*d* generates a control signal for the sixth switch Q2 based on the high-level detection signal of the PWM signal and the overflow bit. The sixth switch Q2 is connected in parallel with two ends of the second capacitor C2. The sixth switch Q2 conducts when the PWM signal is at a high level and the overflow bit is valid. Furthermore, in this embodiment, the first controller 114*c* and the second controller 114*d* are AND logic gates, and the fifth switch Q1 and the sixth switch Q1 are NMOS transistors. The fifth switch Q1 conducts when the first controller 114*c* outputs a high level, and the sixth switch Q2 conducts when the second controller 114*d* outputs a high level. In practical applications, corresponding devices can be selected according to actual needs to meet the above logic relationship.

It should be noted that the types of the first, second, third, fourth, fifth, and sixth switches can be set according to needs. The first, second, third, and fourth switches can also be implemented using NMOS.

As shown in FIG. 2, the addition module 12 is connected to an output end of the PWM signal detection module 11, and the first voltage $V_{Toff}$ and the second voltage $V_{Ton}$ are summed to obtain a third voltage $V_{o1}$.

Specifically, in this embodiment, the third voltage $V_{o1}$ satisfies the following equation:

$$V_{o1} = V_{Toff} + V_{Ton} = \frac{T_{PWM}}{T_{H\_CLK}} \cdot \frac{Vref}{2^{DAC}};$$

In the equation, $V_{o1}$ is the third voltage; $V_{Toff}$ is the first voltage; $V_{Ton}$ is the second voltage; $T_{PWM}$ is a period of the PWM signal; $T_{H\_CLK}$ is a period of the sampling clock signal "High CLK";

$$\frac{Vref}{2^{DAC}}$$

is an output voltage accuracy of the first digital-to-analog conversion unit 113; Vref is the highest output reference voltage of the first digital-to-analog conversion unit 113, and DAC is the number of bits of the first digital-to-analog conversion unit 113.

As shown in FIG. 2, the switch signal generation module 13 is connected to an output end of the addition module 12. A switch signal is generated based on the third voltage $V_{o1}$, where the frequency of the switch signal is higher than the frequency of the PWM signal.

Specifically, as shown in FIG. 2, in this embodiment, the switch signal generation module 13 includes a current source 11, a third capacitor C3, a comparison unit 131, and a seventh switch Q3. An end of the current source 11 is connected to the power supply voltage VDD, and the other end of the current source 11 is connected to an upper electrode plate of the third capacitor C3. A lower electrode plate of the third capacitor C3 is grounded. Input ends of the comparison unit 131 are respectively connected to the upper electrode plate of the third capacitor C3 and the output end of the addition module 12, and an output end of the comparison unit 131 is connected to a control end of the seventh switch Q3. The seventh switch Q3 is connected in parallel with two ends of the third capacitor C3, and the seventh switch Q3 conducts when the voltage at the upper electrode plate of the third capacitor C3 reaches the third voltage $V_{o1}$. As an example, a positive input end of the comparison unit 131 is connected to the upper electrode plate of the third capacitor C3, and a negative input end of the comparison unit 131 is connected to the third voltage $V_{o1}$. The seventh switch Q3 is implemented using NMOS. In actual use, the polarities of the input ends of the comparison unit 131 are interchangeable in relation to the corresponding input signals, and the type of the seventh switch Q3 can be selected according to actual logic requirements, not limited to this embodiment.

Specifically, the current source 11 charges the third capacitor C3, satisfying $I1*t_{new}=C3*V_{o1}$. When the third capacitor C3 is charged to the third voltage $V_{o1}$, the comparison unit 131 outputs a high level to turn on the seventh switch Q3, discharging the third capacitor C3 and starting a new cycle. The period of the switch signal is determined by the equation:

$$t_{new} = \frac{C3}{I1} \cdot \frac{Vref}{T_{H\_CLK} \cdot 2^{DAC}} \cdot T_{PWM},$$

where $t_{new}$ is a period of the switch signal, C3 is a capacitance of the third capacitor, and I1 is a current flowing through the current source. If $$\frac{1}{K1} = \frac{C3}{I1} \cdot \frac{Vref}{T_{H\_CLK} \cdot 2^{DAC}},$$

then $$t_{new} = \frac{1}{K1} \cdot T_{PWM},$$

or $$F_{new} = \frac{I1}{C3 \cdot V_{o1}} = K1 \cdot F_{PWM},$$

which means the frequency of the switch signal is K1 times higher than the frequency of the PWM signal (where I1, C3, $V_{ref}$, $T_{H\_CLK}$, and $2^{DAC}$ are all fixed internal parameters, so K1 is also a fixed value).

As shown in FIG. 2, the duty cycle ratio generation module 14 is connected to an output end of the switch signal generation module 13. The duty cycle ratio generation module 14 starts counting the switch signal at the rising edge of the PWM signal and stops counting at the falling edge of the PWM signal, obtaining the duty cycle ratio "Duty out" of the PWM signal.

Specifically, as shown in FIG. 2, in this embodiment, the duty cycle ratio generation module 14 includes a second counting unit 141 and a latch 142. A clock end "CLK" of the second counting unit 141 is connected to the output end of the switch signal generation module 13, and a reset end "Reset" of the second counting unit 141 is connected to the rising edge trigger signal "rising edge" of the PWM signal. An input end of the latch 142 is connected to an output end of the second counting unit 141, a control end of the latch 142 is connected to the falling edge trigger signal "falling edge" of the PWM signal, and the latch 142 outputs the duty cycle ratio "Duty out" of the PWM signal. The duty cycle of the PWM signal satisfies:

$$Duty = \frac{K2}{K1},$$

where K1 represents a multiple of the frequency of the switch signal higher than the frequency of the PWM signal; K2 represents the result of the high-level count of the switch signal to the PWM signal.

Specifically, if appropriate parameters (I1, C3, $V_{ref}$, $T_{H\_CLK}$, and $2^{DAC}$) are set, such that K1=100, then the signal "Duty out" output by the latch 142 based on the count value K2 of the second counting unit 141 can be directly used as the reading of the duty cycle.

As shown in FIG. 2, the output voltage generation module 15 is connected to an output end of the duty cycle ratio generation module 14. Based on the duty cycle ratio "Duty out" of the PWM signal, an output voltage "Out" related to the duty cycle of the PWM signal is obtained.

Specifically, as shown in FIG. 2, in this embodiment, the output voltage generation module 15 includes a second digital-to-analog conversion unit 151 and a voltage division unit 152. The second digital-to-analog conversion unit 151 receives the duty cycle ratio "Duty out" of the PWM signal and converts it into an analog signal. The voltage division unit 152 is connected to an output end of the second digital-to-analog conversion unit 151 to perform voltage division on the analog signal output by the second digital-to-analog conversion unit 151 to obtain the output voltage "Out". It should be noted that the voltage division unit 152 is used to adjust the proportional relationship between the output voltage and the PWM signal. In practical applications, the voltage division unit 152 can be omitted and is not limited to this embodiment.

Specifically, when the counting value of the second counting unit 141 is K1, the corresponding output voltage value of the second digital-to-analog conversion unit 151 is referred to as the preset value Ref. After voltage division, the output voltage "Out" is obtained. If $$K1 \cdot \frac{R2}{R1+R2} = 100$$

(for convenience of calculation, at this time K1=100, R1=0, the highest output reference voltage of the first digital-to-analog conversion unit 113 is equal to the highest output reference voltage of the second digital-to-analog conversion unit 151), then the output voltage "Out"=Ref*Duty. Therefore, a stable reference voltage value related to the duty cycle of the PWM signal can be obtained. Similarly, when K1>100, 100/K1=R2/(R1+R2), the reference voltage value related to the duty cycle of the PWM signal can also be obtained.

Embodiment 2

Figure 4:
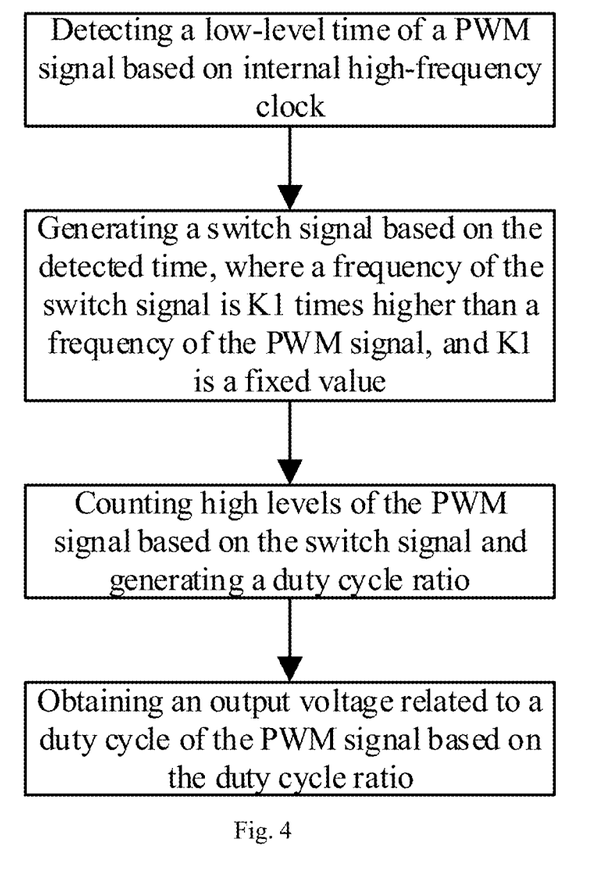
FIG. 4 shows a schematic flow chart of a PWM signal conversion method of the present disclosure.

As shown in FIG. 4, this embodiment provides a PWM signal conversion method. As an example, the PWM signal conversion method is implemented using the PWM signal conversion circuit of Embodiment 1. In actual use, any hardware circuit or software code that can implement this method is applicable. The PWM signal conversion method includes:

S1: Obtaining a PWM signal, detecting a low-level time of the PWM signal and obtaining a corresponding first voltage $V_{Toff}$, and detecting a high-level time of the PWM signal and obtaining a corresponding second voltage $V_{Ton}$.

Specifically, first, a sum of rising and falling edges of the PWM signal is counted based on a sampling clock signal "High CLK" (internal high-frequency clock), and the counting result is converted into an analog signal. Then, the first voltage and the second voltage are generated based on the analog signal of the counting result and a rising edge trigger signal, a falling edge trigger signal, a high-level detection signal, and a low-level detection signal of the PWM signal. As shown in FIG. 3, when the PWM signal transitions to a low level, the falling edge trigger signal and low-level detection signal are valid, while the rising edge trigger signal and high-level detection signal are invalid. At this time, the second switch S2, the third switch S3, and the fifth switch Q1 are on, while the first switch S1, the fourth switch S4, and the sixth switch Q2 are off. The output signal of the first digital-to-analog converter 113 charges the second capacitor C2, and the first voltage $V_{Toff}$ is obtained. When the PWM signal transitions to a high level, the falling edge trigger signal and low-level detection signal are invalid, while the rising edge trigger signal and high-level detection signal are valid. At this time, the second switch S2, the third switch S3, and the fifth switch Q1 are off, while the first switch S1, the fourth switch S4, and the sixth switch Q2 are on. The output signal of the first digital-to-analog converter 113 charges the first capacitor C1, and the second voltage $V_{Ton}$ is obtained. The voltage value of the first voltage $V_{Toff}$ reflects the low-level time of the PWM signal, and the voltage value of the second voltage $V_{Ton}$ reflects the high-level time of the PWM signal.

It should be noted that any method capable of detecting the low and high level times of the PWM signal is applicable to the present disclosure, and is not limited to the embodiments described herein.

S2: Summing the first voltage $V_{Toff}$ with the second voltage $V_{Ton}$ to obtain a third voltage $V_{o1}$.

S3: Generating a switch signal based on the third voltage $V_{o1}$, where a frequency of the switch signal is K1 times higher than a frequency of the PWM signal, and K1 is a fixed value.

Specifically, as shown in FIG. 2, the current source 11 charges the third capacitor C3. At this time, the comparator unit 131 outputs a low level, the seventh switch Q3 is off. As the charging progresses, the voltage on the third capacitor C3 increases. When the voltage on the third capacitor C3 reaches the third voltage Vo1, the comparator unit 131 transitions to a high level, the seventh switch Q3 conducts, and the third capacitor C3 starts to discharge. When the voltage on the third capacitor C3 is lower than the third voltage $V_{o1}$, the comparator unit 131 transitions back to a high level, and this cycle continues to generate the switch signal.

Specifically, in this embodiment, $$\frac{1}{K1} = \frac{C3}{I1} \cdot \frac{Vref}{T_{H\_CLK} \cdot 2^{DAC}},$$

-continued
$$F_{new} = \frac{I1}{C3 \cdot V_{o1}} = K1 \cdot F_{PWM},$$

where parameters such as I1, C3, $V_{ref}$, $T_{H\_CLK}$, and $2^{DAC}$ are all internally fixed, so K1 is also a fixed value that can be set according to actual needs.

It should be noted that any method that can obtain a frequency of the switch signal higher than the frequency of the PWM signal by a fixed multiple based on the third voltage $V_{o1}$ is applicable to the present disclosure.

S4: Counting high levels of the PWM signal based on the switch signal and generating a duty cycle ratio "Duty out" of the PWM signal.

Specifically, as shown in FIG. 2, the counting of the switch signal starts at the rising edge of the PWM signal and ends at the falling edge of the PWM signal. This yields the count value K2 of the high levels of the PWM signal based on the switch signal. The total count length is K1, then the duty cycle of the PWM signal satisfies:

$$\text{Duty} = \frac{K2}{K1}.$$

As an example, if K1 is set to 100, the duty cycle ratio "Duty out" of the PWM signal can be directly used as the reading of the duty cycle.

S5: Obtaining an output voltage "Out" related to a duty cycle of the PWM signal based on the duty cycle ratio "Duty out" of the PWM signal.

Specifically, the duty cycle ratio "Duty out" of the PWM signal is subjected to a digital-to-analog conversion to obtain a voltage related to the duty cycle of the PWM signal. Furthermore, the voltage obtained from the digital-to-analog conversion can be further adjusted through voltage division to obtain the desired output voltage, where the output voltage "Out"=Ref*Duty.

Embodiment 3

Figure 5:
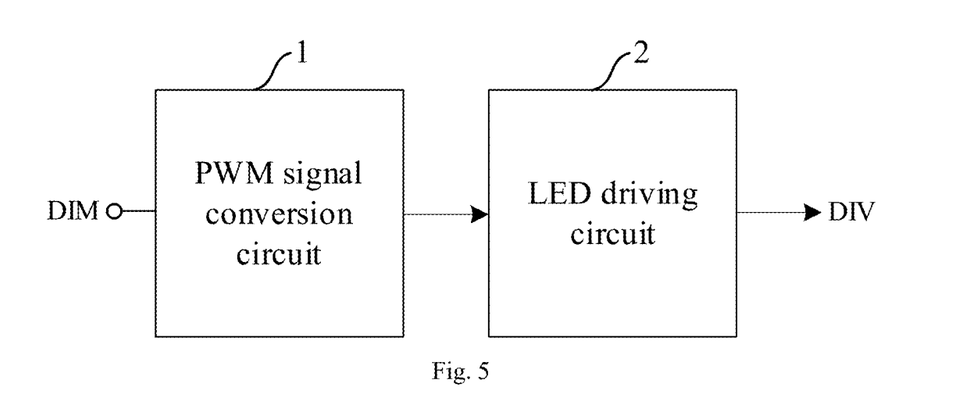
FIG. 5 shows a schematic diagram of the structure of an LED dimming system of the present disclosure.

As shown in FIG. 5, this embodiment provides an LED dimming system, which includes:

A PWM signal conversion circuit 1 and an LED driving circuit 2.

As shown in FIG. 5, the PWM signal conversion circuit 1 converts a dimming PWM signal into an analog output voltage.

Specifically, the PWM signal is input into the PWM signal conversion circuit 1 through a dimming port DIM, resulting in an output voltage related to a duty cycle of the PWM signal. The output voltage is provided as a reference signal to the LED driving circuit 2.

It should be noted that the structure and working principle of the PWM signal conversion circuit 1 can be found in Embodiment 1, and will not be repeated here.

As shown in FIG. 5, the LED driving circuit 2 is connected to the PWM signal conversion circuit and drives an LED light string for dimming control based on an output signal of the PWM signal conversion circuit 1.

Specifically, the LED driver circuit 2 uses the output signal of the PWM signal conversion circuit 1 as a reference signal to adjust a driving signal DIV, thereby achieving dimming control of the LED light string.

It should be noted that any circuit structure that can achieve dimming control by using an output voltage related to the duty cycle of the PWM signal as a reference is applicable to the LED driving circuit 2 of the present disclosure. The specific structure will not be described in detail here.

The present disclosure samples and converts the high and low level time of the externally input PWM dimming signal to generate a switching signal with a higher frequency and a fixed multiple for counting the PWM signal, thereby obtaining the duty cycle signal of the PWM signal and outputting the corresponding reference voltage. The frequency at which the duty cycle of the PWM signal is counted is a fixed multiple of the frequency of the PWM signal, so no matter how the frequency of the PWM signal changes, the counting of the duty cycle remains constant. The conversion of the low-frequency PWM dimming signal to analog dimming does not require the use of large capacitors, and the output signal can respond to the input PWM signal in real time, and the circuit and system can be integrated in the chip to simplify the peripheral circuit.

In summary, the present disclosure provides a PWM signal conversion circuit and method, and an LED dimming system. The circuit includes: a PWM signal detection module, which receives a PWM signal, detects a low-level time and a high-level time of the PWM signal, and outputs a first voltage corresponding to the low-level time and a second voltage corresponding to the high-level time; an addition module connected to an output end of the PWM signal detection module, summing the first voltage and the second voltage to obtain a third voltage; a switch signal generation module connected to an output end of the addition module, generating a switch signal based on the third voltage, wherein a frequency of the switch signal is higher than a frequency of the PWM signal; a duty cycle ratio generation module connected to an output end of the switch signal generation module, starting counting the switch signal at a rising edge of the PWM signal, ending the counting at a falling edge of the PWM signal, and obtaining a duty cycle ratio of the PWM signal; and an output voltage generation module connected to an output end of the duty cycle ratio generation module, obtaining an output voltage related to a duty cycle of the PWM signal based on the duty cycle ratio of the PWM signal. The PWM signal conversion circuit and method, and the LED dimming system of the present disclosure can extract the duty cycle ratio of low-frequency PWM signals without the need for large capacitors, and the circuit and system can be integrated into the chip, simplifying the peripheral circuit of the chip. The extraction of the duty cycle ratio of the PWM signal only requires one PWM signal cycle, enabling the output signal to changes with the PWM signal in real-time, with fast and efficient response. The frequency of counting the duty cycle of the PWM signal is a fixed multiple of the PWM frequency itself, so regardless of how the PWM signal frequency changes, the counting of the duty cycle remains constant and highly accurate. Therefore, the present disclosure effectively overcomes various drawbacks of the prior art and has high industrial utility value.

The above-mentioned embodiments are just used for exemplarily describing the principle and effects of the present disclosure instead of limiting the present disclosure. Those skilled in the art can make modifications or changes to the above-mentioned embodiments without going against the spirit and the range of the present disclosure. Therefore, all equivalent modifications or changes made by those who have common knowledge in the art without departing from the spirit and technical concept disclosed by the present disclosure shall be still covered by the claims of the present disclosure.

The invention claimed is:

1. A PWM signal conversion circuit, comprising at least:
   a PWM signal detection module configured to receive a PWM signal, detect a low-level time and a high-level time of the PWM signal, and output a first voltage corresponding to the low-level time and a second voltage corresponding to the high-level time;
   an addition module connected to an output end of the PWM signal detection module, configured to sum the first voltage and the second voltage to obtain a third voltage;
   a switch signal generation module connected to an output end of the addition module, configured to generate a switch signal based on the third voltage, wherein a frequency of the switch signal is higher than a frequency of the PWM signal;
   a duty cycle ratio generation module connected to an output end of the switch signal generation module, configured to start counting the switch signal at a rising edge of the PWM signal, end the counting at a falling edge of the PWM signal, and obtain a duty cycle ratio of the PWM signal; and
   an output voltage generation module connected to an output end of the duty cycle ratio generation module, configured to obtain an output voltage related to a duty cycle of the PWM signal based on the duty cycle ratio of the PWM signal.

2. The PWM signal conversion circuit according to claim 1, wherein the PWM signal detection module comprises a detection unit, a first counting unit, a first digital-to-analog conversion unit, and a time-voltage conversion unit;
   wherein the detection unit is configured to receive the PWM signal and detect a falling edge, a rising edge, a low level, and a high level of the PWM signal;
   wherein the first counting unit is connected to an output end of the detection unit, and is configured to count a total number of falling and rising edges of the PWM signal based on a sampling clock signal, and output a counting result and overflow bit;
   wherein the first digital-to-analog conversion unit is connected to an output end of the first counting unit, and is configured to convert the counting result into an analog signal;
   wherein the time-voltage conversion unit is connected to output ends of the detection unit, the first counting unit, and the first digital-to-analog conversion unit, and is configured to generate the first voltage and the second voltage based on an output signal from the first digital-to-analog conversion unit, the overflow bit, and a detection signal of the PWM signal.

3. The PWM signal conversion circuit according to claim 2, wherein the detection unit comprises a falling edge trigger, a rising edge trigger, a low-level detector, and a high-level detector.

4. The PWM signal conversion circuit according to claim 2, wherein the first counting unit comprises an adder and a counter; the adder is connected to output ends of the detection unit, and sums a rising edge trigger signal and a falling edge trigger signal of the PWM signal; a reset end of the counter is connected to an output end of the adder, a clock end of the counter is configured to receive the sampling clock signal, a first output end of the counter is configured to output the counting result, and a second output end of the counter is configured to output the overflow bit.

5. The PWM signal conversion circuit according to claim 2, wherein the time-voltage conversion unit comprises a first switch, a second switch, a third switch, a fourth switch, a fifth switch, a sixth switch, a first diode, a second diode, a first capacitor, a second capacitor, a first voltage output subunit, a second voltage output subunit, a first controller, and a second controller;

wherein an end of the first switch is connected to the output end of the first digital-to-analog conversion unit, another end of the first switch is connected to an input end of the first voltage output subunit, and a control end of the first switch is connected to a rising edge trigger signal of the PWM signal;

wherein an end of the second switch is connected to the output end of the first digital-to-analog conversion unit, another end of the second switch is connected to an anode of the first diode, and a control end of the second switch is connected to a low-level detection signal of the PWM signal; a cathode of the first diode is connected to the input end of the first voltage output subunit;

wherein an end of the third switch is connected to the output end of the first digital-to-analog conversion unit, another end of the third switch is connected to an input end of the second voltage output subunit, and a control end of the third switch is connected to a falling edge trigger signal of the PWM signal;

wherein an end of the fourth switch is connected to the output end of the first digital-to-analog conversion unit, another end of the fourth switch is connected to an anode of the second diode, and a control end of the fourth switch is connected to a high-level detection signal of the PWM signal; a cathode of the second diode is connected to the input end of the second voltage output subunit;

wherein an upper electrode plate of the second capacitor is connected to the input end of the first voltage output subunit, and a lower electrode plate of the second capacitor is grounded;

wherein an upper electrode of the first capacitor is connected to the input end of the second voltage output subunit, and a lower electrode plate of the first capacitor is grounded;

wherein the first controller is connected to the output ends of the detection unit and the first counting unit; the first controller is configured to generate a control signal for the fifth switch based on the low-level detection signal of the PWM signal and the overflow bit; the fifth switch is connected in parallel with two ends of the first capacitor, and the fifth switch conducts when the PWM signal is at a low level and the overflow bit is valid;

wherein the second controller is connected to the output ends of the detection unit and the first counting unit; the second controller is configured to generate a control signal for the sixth switch based on the high-level detection signal of the PWM signal and the overflow bit; the sixth switch is connected in parallel with two ends of the second capacitor, and the sixth switch conducts when the PWM signal is at a high level and the overflow bit is valid.

6. The PWM signal conversion circuit according to claim 5, wherein the first controller and the second controller are AND logic gates, and the fifth switch and the sixth switch are NMOS transistors.

7. The PWM signal conversion circuit according to claim 2, wherein the third voltage satisfies the following equation:

$$V_{o1} = V_{Toff} + V_{Ton} = \frac{T_{PWM}}{T_{H\_CLK}} \cdot \frac{Vref}{2^{DAC}};$$

wherein $V_{o1}$ is the third voltage; $V_{Toff}$ is the first voltage; $V_{Ton}$ is the second voltage; $T_{PWM}$ is a period of the PWM signal; $T_{H\_CLK}$ is a period of the sampling clock signal;

$$\frac{Vref}{2^{DAC}}$$

is an output voltage accuracy of the first digital-to-analog conversion unit; Vref is the highest output reference voltage of the first digital-to-analog conversion unit, and DAC is a number of bits of the first digital-to-analog conversion unit.

8. The PWM signal conversion circuit according to claim 1, wherein the switch signal generation module comprises a current source, a third capacitor, a comparison unit, and a seventh switch;

wherein an end of the current source is connected to a power supply voltage, and the other end of the current source is connected to an upper electrode plate of the third capacitor; a lower electrode plate of the third capacitor is grounded;

wherein input ends of the comparison unit are respectively connected to the upper electrode plate of the third capacitor and the output end of the addition module, and an output end of the comparison unit is connected to a control end of the seventh switch;

wherein the seventh switch is connected in parallel with two ends of the third capacitor, and the seventh switch conducts when a voltage at the upper electrode plate of the third capacitor reaches the third voltage.

9. The PWM signal conversion circuit according to claim 8, wherein a frequency of the switch signal satisfies the following equation:

$$F_{new} = \frac{I1}{C3 \cdot V_{o1}} = K1 \cdot F_{PWM};$$

wherein $F_{new}$ is the frequency of the switch signal; K1 is a multiple of the frequency of the switch signal higher than the frequency of the PWM signal, set to a fixed value; $F_{PWM}$ is the frequency of the PWM signal; I1 is a current flowing through the current source; C3 is a capacitance value of the third capacitor; $V_{o1}$ is a voltage value of the third voltage.

10. The PWM signal conversion circuit according to claim 1, wherein the duty cycle ratio generation module comprises a second counting unit and a latch;

wherein a clock end of the second counting unit is connected to the output end of the switch signal generation module, and a reset end of the second counting unit is connected to a rising edge trigger signal of the PWM signal;

wherein an input end of the latch is connected to an output end of the second counting unit, a control end of the latch is connected to a falling edge trigger signal of the PWM signal, and the latch is configured to output the duty cycle ratio of the PWM signal.

11. The PWM signal conversion circuit according to claim 1, wherein the output voltage generation module comprises a second digital-to-analog conversion unit and a voltage division unit; the second digital-to-analog conversion unit is configured to receive the duty cycle ratio of the PWM signal and convert it into an analog signal; the voltage division unit is connected to an output end of the second digital-to-analog conversion unit to perform voltage division on the analog signal output by the second digital-to-analog conversion unit to obtain the output voltage.

12. A PWM signal conversion method, comprising at least:
    obtaining a PWM signal, detecting a low-level time of the PWM signal and obtaining a corresponding first voltage, and detecting a high-level time of the PWM signal and obtaining a corresponding second voltage;
    summing the first voltage with the second voltage to obtain a third voltage;
    generating a switch signal based on the third voltage, wherein a frequency of the switch signal is higher than a frequency of the PWM signal by a fixed multiple;
    counting a high level of the PWM signal based on the switch signal and generating a duty cycle ratio of the PWM signal; and
    obtaining an output voltage related to a duty cycle of the PWM signal based on the duty cycle ratio of the PWM signal.

13. The PWM signal conversion method according to claim 12, further comprising:
    counting a sum of rising and falling edges of the PWM signal to obtain a counting result, and converting the counting result into an analog signal; and
    generating the first voltage and the second voltage based on the analog signal of the counting result and a rising edge trigger signal, a falling edge trigger signal, a high-level detection signal, and a low-level detection signal of the PWM signal.

14. The PWM signal conversion method according to claim 12, wherein the obtaining of the output voltage related to the duty cycle of the PWM signal based on the duty cycle ratio of the PWM signal comprises:
    performing digital-to-analog conversion on the duty cycle ratio of the PWM signal to obtain a voltage related to the duty cycle of the PWM signal; and adjusting the voltage obtained from the digital-to-analog conversion through voltage division to obtain the output voltage.

15. An LED dimming system, comprising at least:
    the PWM signal conversion circuit as in claim 1, configured to convert a dimming PWM signal into an analog output voltage; and
    an LED driving circuit connected to the PWM signal conversion circuit, and configured to drive an LED light string to realize dimming control based on an output signal of the PWM signal conversion circuit.

* * * * *